United States Patent [19]

McIntyre et al.

[11] Patent Number: 4,969,986

[45] Date of Patent: Nov. 13, 1990

[54] CONTROLLED POTENTIAL ELECTROLYSIS APPARATUS

[75] Inventors: John M. McIntyre, Lake Jackson, Tex.; Bruce R. Smith, Muskegon, Mich.

[73] Assignee: The Dow Chemical Company, Midland, Mich.

[21] Appl. No.: 434,396

[22] Filed: Nov. 13, 1989

Related U.S. Application Data

[60] Continuation of Ser. No. 306,135, Feb. 6, 1989, abandoned, which is a division of Ser. No. 250,454, Sep. 28, 1988, Pat. No. 4,832,937.

[51] Int. Cl.$^5$ .................. C25B 15/02; C25B 9/00; C25B 11/03
[52] U.S. Cl. .................. 204/231; 204/252; 204/292; 204/294; 204/435; 204/284
[58] Field of Search .................. 204/252–258, 204/263–266, 131, 228, 294, 284, 231, 435

[56] References Cited

U.S. PATENT DOCUMENTS

| 4,436,712 | 3/1984 | Olson | 423/573 |
|---|---|---|---|
| 4,436,714 | 3/1984 | Olson | 423/573 |
| 4,443,423 | 4/1984 | Olson | 423/573 |
| 4,443,424 | 4/1984 | Olson | 423/573 |
| 4,623,440 | 11/1986 | Cairns | 204/231 |
| 4,643,886 | 2/1987 | Chang et al. | 423/226 |

Primary Examiner—Donald R. Valentine

[57] ABSTRACT

Electrochemical regeneration in an electrochemical cell of spent scrubbing solutions containing polyvalent metal chelates is accomplished without substantial degradation of the chelate by controlling the anolyte pH and maintaining the anode potential of the cell above the oxidation potential of the polyvalent metal chelate but below the oxidation potential of the chelate portion of the polyvalent metal chelate.

6 Claims, No Drawings

CONTROLLED POTENTIAL ELECTROLYSIS APPARATUS

This is a continuation of copending application, Ser. No. 7/306,135, Feb. 6, 1989 now abandoned which is a divisional application of Ser. No. 0/250,454 filed on Sept. 28, 1988, now U.S. Pat. No. 4,832,937.

BACKGROUND OF THE INVENTION (1) Field of the Invention

The present invention relates generally to the regeneration of a spent scrubbing solution containing a polyvalent metal chelate subsequent to its use in removal of hydrogen sulfide from a sour, gaseous stream.

(2) Description of the Prior Art

The use of an aqueous chelated polyvalent metal catalyst solution for removing hydrogen sulfide from a sour, gas stream is well known in the art. The chelated polyvalent metal aqueous solution upon contact with the hydrogen sulfide-containing gas stream effects oxidation of the hydrogen sulfide to elemental sulfur and at the same time the polyvalent metal chelate is reduced to a lower valence state. Most frequently the polyvalent metal utilized is iron. Regeneration of the chelated polyvalent metal solution by the oxidation of the ferrous chelate to the ferric chelate is most generally accomplished by contacting the solution with an oxygen-containing gas. U.S. Pat. No. 4,622,212 to McManus et al provides a representative listing of United States patents illustrating processes for removal of hydrogen sulfide from a sour gaseous stream using a polyvalent metal chelate. In McManus et al, excessive degradation during regeneration of the chelating agent is prevented by incorporation of a stabilizing agent such as an alkaline thiosulfate in the polyvalent metal chelate scrubbing solution. This patent is hereby incorporated by reference as providing a particularly thorough discussion of the early prior art showing regeneration of spent polyvalent metal chelate with an oxygen containing gas. A more recent patent in this area is U.S. Pat. No. 4,696,802 to Bedell.

In U.S. Pat. No. 4,455,287 to Primack et al, a method of stabilizing a chelated polyvalent metal, utilized in a scrubbing solution for removing hydrogen sulfide from a gas stream, is disclosed as the use of a broad spectrum biocide. This prevents degradation of the chelated polyvalent metal caused by contamination of the aqueous composition with microorganisms such as bacteria.

In U.S. Pat. No. 4,532,118 to Tajiri et al, the degeneration of a chelated polyvalent metal utilized in a scrubbing solution for removal of hydrogen sulfide from a gas stream is referred to as causing the formation of ferrous sulfide which when mixed with the free sulfur product causes a darkening in color of the sulfur, thereby impairing the commercial value thereof. The means suggested by Tajiri et al of reducing degradation of the polyvalent metal chelate is to adjust the mole ratio of ferric ion to total iron ions in the scrubbing solution in the range of 0.6 to 0.9.

Regeneration of spent scrubbing solutions utilizing an electrochemical cell is also known in the art. In U.S. Pat. No. 4,126,529 to DeBerry, the spent ferric chelate containing scrubbing solution utilized to remove oxides of nitrogen and sulfur from flue gases is regenerated by passing the solution through the cathode compartment of an electrochemical cell. The regeneration process involves the removal of the sulfate ions from the scrubbing solution through the ion transfer membrane and the reduction of the non-reactive ferric chelate to the reactive ferrous chelate. In U.S. Pat. No. 4,076,793 to Nikolai a method is disclosed for removing sulfur dioxide from a gas stream utilizing an aqueous slurry of manganous hydroxide as an absorbent. Manganous sulfate is regenerated to manganous hydroxide by aqueous phase electrochemical precipitation from the spent scrubbing solution. In U.S. Pat. No. 4,041,129 to Foster et al, a process is disclosed for removal of acidic gases from hydrocarbon streams in which regeneration of the scrubbing solution is disclosed as utilizing an electrolytic cell. In this process an aqueous sodium hydroxide solution is utilized to scrub the acidic gases. The rich, scrubbing solution is thereafter reacted with aqueous sulfuric acid to liberate the acidic gases such as hydrogen sulfide and the resulting aqueous sodium sulfate solution is converted electrolytically to sodium hydroxide at the cathode of an electrochemical cell.

Regeneration of spent hydrogen sulfide scrubbing solutions utilizing a fuel cell is disclosed in U.S. Pat. No. 4,320,180 to Nozaki and U.S. Pat. No. 4,436,713 and U.S. Pat. No. 4,436,711 both to Olson. The Olson patents indicate that degradation of the polyvalent metal chelate may be caused by or enhanced by regeneration of the spent scrubbing solution with oxygen or an oxygen-containing gas and that regeneration utilizing a fuel cell avoids this problem.

Regeneration of a hydrogen sulfide spent gas scrubbing solution containing a polyvalent metal chelate by the use of an electrolytic cell is disclosed in U.S. Pat. No. 4,643,886 to Chang et al and in the Olson U.S. Pat. Nos. 4,436,712 and '714 and U.S. Pat. Nos. 4,443,423 and '424. Each of these patents teaches reduced degradation of the polyvalent metal chelate during regeneration of the chelate in an electrolytic cell as compared to regeneration using oxygen or an oxygen-containing gas.

In none of the prior art references in which a polyvalent metal chelate is regenerated utilizing an electrolytic cell or a fuel cell is the electrical potential imposed upon the electrolytic cell controlled such that the potential of the cell is maintained at a value lower than the oxidation potential of the polyvalent metal chelate. The applicant is therefore the first to discover that all degradation of a polyvalent metal chelate can be avoided during regeneration of a polyvalent metal chelate from a lower valence state to a higher valence state in the anode compartment of an electrolytic cell simply by maintaining the anode potential below the oxidation potential of the chelate portion of the polyvalent metal chelate being regenerated.

SUMMARY OF THE INVENTION

In accordance with the present invention, it has now been found that by controlling the anode potential of an electrochemical cell utilized to regenerate a spent, gas scrubbing solution containing at least one polyvalent metal chelate, regeneration can be accomplished generally without substantial degradation of the chelate portion of the polyvalent metal chelate, and preferably without degradation. In the process of the invention for converting a lower valence state polyvalent metal chelate to a higher valence state polyvalent metal chelate, the anode potential of the electrochemical cell is controlled to a value which is below the oxidation potential of the chelate portion of the polyvalent metal chelate and above the oxidation potential of the polyvalent metal chelate. The regeneration reaction is particularly suitable for practice in an electrochemical cell of the invention in which the rate of reactivity is commercially practical in spite of the low cell potential required. In the electrochemical cell of the invention, an increased regeneration rate is attained by the use of a high surface area anode. Also disclosed is a method for preventing degradation of a polyvalent metal chelate present in a spent gas scrubbing solution by the use of an electrolytic cell to effect regeneration and a process for removing hydrogen sulfide from a sour gaseous stream utilizing an electrolytic cell for regeneration of the spent gas stream scrubbing solution. Preferably, the process is continuous.

DETAILED DESCRIPTION OF THE INVENTION

It has been generally recognized that the most effective polyvalent metal chelates for removal of hydrogen sulfide from a process stream are based upon amino polycarboxylic acid chelating agents, for instance, ethylenediamine tetraacetic acid (EDTA) and its homologs. It is this type of chelating agent that degrades rapidly in a continuous process for removal of hydrogen sulfide when the spent chelated polyvalent metal scrubbing solution is regenerated using oxygen or an oxygen-containing gas. In the regeneration step, the polyvalent metal is converted from the lower valence state to the higher valence state in which it is active as an oxidizing agent for hydrogen sulfide to convert this gas to elemental sulfur. In the contact zone, the polyvalent metal chelate is reduced from the higher valence state of the metal to the lower valence state of the metal so that the coordination number of the metal is reduced.

In accordance with the invention, a process is disclosed for removal of hydrogen sulfide from a sour, fluid stream and conversion to elemental sulfur. A polyvalent metal chelate is utilized in an aqueous, alkaline, scrubbing solution, preferably in a continuous process, to convert the hydrogen sulfide to sulfur. Regeneration is accomplished in an electrolytic cell wherein the anodic potential of the cell is controlled so as to prevent degradation of the polyvalent metal chelate. In addition, a process is disclosed for preventing degradation of a polyvalent metal chelate present in a spent, scrubbing solution used to remove hydrogen sulfide from a sour, fluid stream wherein the polyvalent metal chelate is regenerated in an electrolytic cell and subsequently recycled to a contact zone for use in oxidizing hydrogen sulfide to sulfur. An electrolytic cell is disclosed which is particularly suitable for the regeneration of a polyvalent metal chelate present in a spent, gas stream, scrubbing solution for removal of hydrogen sulfide from a sour, fluid stream wherein a porous anode is utilized and the cell is operated with a controlled anodic potential in order to avoid degradation of the polyvalent metal chelate.

In the process of the invention, generally a hydrogen sulfide containing, fluid stream, i.e., a gas stream is contacted in a contact zone with an aqueous, alkaline solution containing a polyvalent metal chelate wherein the metal is in the oxidized, i.e., the higher valence, state. The particular type of fluid stream treated is not critical as will be evident to those skilled in the art. Streams particularly suited to removal of $H_2S$ by the practice of the invention are naturally-occurring hydrocarbon gas streams, synthesis gases, refinery process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, and other gaseous hydrocarbon streams. The term "hydrocarbon gas stream(s)", as employed herein, is intended to include streams containing significant quantities of hydrocarbon (both paraffinic and aromatic), it being recognized that such streams contain significant "impurities" not technically defined as a hydrocarbon. Streams containing principally a single hydrocarbon, e.g., ethane, are eminently suited to the practice of the invention. Streams derived from the gasification and/or partial oxidation of gaseous or liquid hydrocarbons may be treated by the invention. The $H_2S$ content of the type of streams contemplated will vary extensively, but, in general, will range from about 0.1 percent to about 10 percent by volume. The amount of $H_2S$ present is not generally a limiting factor in the practice of the invention.

Temperatures employed in the contact zone wherein hydrogen sulfide is absorbed utilizing an aqueous, alkaline solution are not generally critical, except that the reaction is generally carried out at a temperature below the melting point of sulfur. The preferred operating temperature range is from about 10° centigrade to about 70° centigrade. The most preferred temperature range is from about 25° to about 50° centigrade. At higher temperatures, the rate of polyvalent metal chelate degradation increases to unacceptable levels. At lower temperatures, reaction kinetics slow down while hydrogen sulfide absorption increases, which can cause a chemical imbalance to occur. In addition, at lower temperatures soluble components of the aqueous alkaline solution may be precipitated from solution. Contact times in the contact zone generally range from about 1 second to about 270 seconds or longer, with contact times of about 2 seconds to about 120 seconds being preferred.

A feature of the process of the invention is the regeneration of a polyvalent metal chelate in an electrolytic cell under controlled anolyte pH as well as controlled anodic potential conditions. Regeneration is accomplished, subsequent to separation of sulfur from the rich, aqueous, alkaline, scrubbing solution, by passing the spent scrubbing solution to the anode compartment of an electrochemical cell. In this cell, the operating range for anolyte pH is generally from about 6.5 to about 7.5. The preferred range is about 6.9 to about 7.1. In general, an anolyte pH of about 7 is preferred in order to avoid degradation of the polyvalent metal chelate during regeneration. In general, the desired anodic potential must be determined for each specific polyvalent metal chelate. For instance, for ethylene diamine tetra-acetic acid, the anodic potential must be below +0.4.

The pH operating range in the contact zone of the process generally can from about 6 to about 10, the preferred range being from about 7 to about 9, and the most preferred range being from about 8 to about 9. The contact zone of the process is operated generally at the highest possible pH within the above contact zone pH range in order to operate at a high efficiency of hydrogen sulfide absorption. Since hydrogen sulfide is an acid gas, the aqueous alkaline solution upon absorption of the hydrogen sulfide in the contact zone is lowered in pH. The optimum pH depends upon the particular polyvalent metal chelating agent, particularly the polyvalent metal utilized therein. Thus the ability of the polyvalent metal chelating agent to protect the metal from precipitation as an insoluble sulfide or hydroxide at high pH values will determine how high in pH the aqueous alkaline solution in the contact zone can be used. For instance, at pH values below about 6, the efficiency of absorption of hydrogen sulfide with an iron chelate in the contact zone is so low as to be impractical. While at pH values greater than about 10, the precipitation of insoluble iron hydroxide occurs resulting in decomposition of the chelated iron.

Another feature of the process of the invention and the method of operating an electrolytic cell to regenerate a polyvalent metal chelate lies in the operation of the electrolytic cell at a controlled anodic potential. Specifically, an anodic potential above the oxidation potential of the lower valence state polyvalent metal chelate but below the oxidation potential of the chelate portion of the lower valence state polyvalent metal chelate. In operating the hydrogen sulfide abatement process of the invention in this manner, pure, soluble sulfur is produced since degradation of the polyvalent metal chelate is avoided. In the prior art, electrochemical regeneration processes in which an anodic potential is used which is above the oxidation potential of the polyvalent metal chelate, some of the polyvalent metal chelate is destroyed and unchelated iron is released, which in turn reacts with a portion of the sulfide which is present. The resulting dark colored iron sulfide contaminates the sulfur produced in the process and destroys its value.

In the process of the invention for the abatement of hydrogen sulfide from a sour fluid stream, the rich, scrubbing solution is led to a separation zone in which the elemental sulfur in said solution is recovered by any of the conventional separation processes known for recovery of elemental sulfur from aqueous solutions. For example, the sulfur can be recovered by flocculation and settling, centrifugation, filtration, flotation, and the like. The method of sulfur recovery is not critical to the process of the invention. It is desirable to recover as much as possible of the aqueous, alkaline, scrubbing solution to minimize physical losses of the polyvalent metal chelate.

After sulfur separation, the aqueous, alkaline, scrubbing solution is passed as an electrolyte to the anode compartment of an electrolytic cell containing a permselective cell membrane and a porous anode. Preferably, the anode is a porous graphite anode. A caustic solution is recirculated through the cathode chamber of the electrolytic cell during the regeneration operation. In the anolyte compartment of the cell, the polyvalent metal chelate is oxidized from the reduced or lower valence state to the higher valence state of the polyvalent metal and thereafter the electrolyte is returned as a lean, scrubbing solution to the contact zone of the process. In order to provide optimum pH conditions in the contact zone of the process, additional hydroxide can be added to the anolyte prior to use in the contact zone of the process. The aqueous, alkaline solution utilized in the contact zone upon absorption of hydrogen sulfide is lowered in pH and thereby becomes more suitable for regeneration under optimum pH conditions in the electrolytic cell of the invention.

Any oxidizing polyvalent metal chelating agent can be used in the process of the invention but those in which the polyvalent metal is iron, copper, and manganese are most preferred, particularly iron. Other useful metals which can provide the polyvalent metal of the polyvalent metal chelating agent are generally those that are capable of undergoing a reduction- oxidation reaction. Generally, those metals are suitable which are capable of being reduced to a lower valence state by reaction with hydrosulfide or sulfide ions and which can be regenerated by oxidation with an oxygen containing gas to a higher valence state. Specific examples of preferred useful metals include, besides the most preferred metals listed above, nickel, chromium, cobalt, tin, vanadium, platinum, palladium, and molybdenum. The metals are normally supplied in the form of a salt, oxide, hydroxide, etc.

The useful polyvalent metal chelates, which can be used singly or in combination, are coordination complexes in which the polyvalent metals form chelates generally by reaction with an amino carboxylic acid, an amino polycarboxylic acid, a polyamino carboxylic acid, or a polyamino polycarboxylic acid. Preferred coordination complexes are those polyvalent metals which form chelates with an acid having the formula:

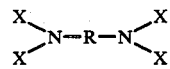

wherein two to four of the X groups are lower alkyl carboxylic groups, zero to two of the X groups are selected from the group consisting of lower alkyl groups, hydroxyalkyl groups, and

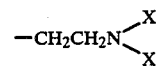

and wherein R is a divalent organic group. Representative divalent organic groups are ethylene, propylene, isopropylene or alternatively cyclohexane or benzene groups where the two hydrogen atoms replaced by nitrogen are in the one or two position, and mixtures thereof.

The polyvalent metal chelates useful in the process of the invention are readily formed in an aqueous medium by reaction of at least one salt, oxide, or hydroxide of the polyvalent metal and, preferably, an amino carboxylic acid or an amino polycarboxylic acid which can also be present in the form of an alkali metal or ammonium salt thereof. Exemplary amino carboxylic acids include (1) amino acetic acids derived from ammonia or 2-hydroxy aklyl amines, such as glycine, diglycine (imino diacetic acid), NTA (nitrilo triacetic acid), 2-hydroxy alkyl glycine; di-hydroxyalkyl glycine, and hydroxyethyl or hydroxypropyl diglycine; (2) amino acetic acids derived from ethylene diamine, diethylene triamine, 1,2-propylene diamine, and 1,3-propylene diamine, such as EDTA (ethylene diamine tetraacetic acid), HEDTA (2-hydroxyethyl ethylene diamine tetraacetic acid), DEPTA (diethylene triamine pentaacetic acid); and (3) amino acetic acid derivatives of cyclic 1,2-diamines, such as 1,2-diamino cyclohexane N,N-tetraacetic acid and 1,2-phenylenediamine-N,N-tetraacetic acid. The iron chelates of NTA and 2-hydroxyethyl ethylene diamine triacetic acid are preferred.

The polyvalent metal chelate is used in the contact zone of the process generally in an effective amount suitable for oxidizing substantially all the hydrogen sulfide removed from the hydrogen sulfide containing gas scrubbed in the contact zone of the process by the aqueous alkaline scrubbing solution. Preferably, an amount is used of about 2 moles to about 10 moles of polyvalent metal chelate per mole of hydrogen sulfide absorbed by the aqueous alkaline solution, although an amount up to the solubility limit of the polyvalent metal chelate in the aqueous alkaline solution can used. Most preferably, about 2 moles to about 5 moles of polyvalent metal chelate per mole of absorbed hydrogen sulfide is used.

The buffering agents which are useful as optional components of the aqueous, alkaline, lean, scrubbing solution of the invention are in general those which are capable of stabilizing said aqueous, alkaline, scrubbing solution to a pH in the desired operating pH range of generally about 6 to about 10. The buffering agents should be water soluble at the concentrations in which they are effective. Examples of suitable buffering agents optionally used in the process of the invention are the alkali metal salts of carbonates, bicarbonates, or borates. Examples of useful specific buffering agents within these classes of buffering agents are sodium carbonate-bicarbonate or sodium borate. Where the hydrogen sulfide containing feed gas also contains carbon dioxide at a volume percent of greater than about 5%, the carbonate-bicarbonate buffers are the preferred buffers for use in the process of the invention. These may be produced insitu by the addition of a base such as sodium hydroxide in the preparation of the aqueous, alkaline, scrubbing solution. Where the hydrogen sulfide containing feed gas contains carbon dioxide only in a minor amount, (less than about 5%), then the borate buffers, for example, borax or sodium borate ($Na_2B_4O_7$) are useful.

Hydrogen sulfide absorbents can be employed in the contact zone to increase the absorptivity of the aqueous, alkaline, scrubbing solution. Any of the known absorbents conventionally used which do not affect the activity of the polyvalent metal chelate can be used. The hydrogen sulfide solvent can be either a physical solvent or a regenerable chemical solvent but a physical solvent is preferred. The vapor pressure of the hydrogen sulfide solvent should be low enough so that it is not stripped from the solution in substantial amounts in the contact zone of the process. The hydrogen sulfide solvent can be either an organic or an inorganic solvent or a solvent which, in combination with the aqueous, alkaline solution, increases the solubility of the combined solution with respect to hydrogen sulfide. Examples of suitable hydrogen sulfide solvents are as follows: tripotassium phosphate, tributyl phosphate, tetrahydrothiophene dioxide, dimethyldithiodipropionate, N-methyl-2-pyrrolidone, N-methylpyrrolidine, N-formylmorpholine, N-formyldimethylmorpholine, N,N-dimethylformamide, propylene carbonate, dialkyl ethers of polyethylene glycols, and dimethyl or diethyl glycine salts. The particular hydrogen sulfide absorbent chosen is a matter of choice given the qualification that the hydrogen sulfide solvent must not effect the activity of the polyvalent metal chelate and the hydrogen sulfide solvent must exhibit sufficient solubility for hydrogen sulfide.

The contact zone of the process in which a hydrogen sulfide containing gas stream is contacted with a lean, scrubbing solution containing a polyvalent metal chelate can be operated at ambient conditions of temperature and pressure. Temperatures from about 5° to about 65° C. and pressures from about subatmospheric to 100 atmospheres or greater can be used.

In the regeneration process of the invention, the electrolytic cell is operated at an anodic potential which is less than the oxidation potential of the chelate portion of the specific polyvalent metal chelate used and above the oxidation potential of the polyvalent metal chelate. Preferably the regeneration process is conducted using a polyvalent metal chelate derived from an amino carboxylic acid at an anodic potential below +0.4 volts versus a saturated calomel electrode. The oxidation potential of a polyvalent metal chelate solution is dependent upon the concentration of the oxidized and reduced species of polyvalent metal. For instance, the oxidation potentials become more positive with greater concentrations of the oxidized species present. The rate of oxidation is reduced at a given anode potential as the ratio of oxidized to reduced species of polyvalent metal increases.

The following examples illustrate the various aspects of the invention but are not intended to limit its scope. Where not otherwise specified throughout this specification and claims, temperatures are given in degrees centigrade and parts, percentages, and proportions are by weight.

EXAMPLE 1

In order to illustrate the regeneration of a polyvalent metal chelate without decomposition in an electrolytic cell, an electrolytic cell containing a permselective membrane (Nafion ® 324) was utilized together with platinum screen electrodes in an electrolytic cell which was connected to a Princeton Applied Research Model 371 potentiostat which was coupled to a Princeton Applied Research Model 175 universal programmer and an X-Y recorder. The cell was submerged in a constant temperature water bath held at a temperature of 50° C. A saturated calomel reference electrode was used to monitor the anodic electrochemical potential by way of a saturated potassium chloride salt bridge. The catholyte was 100 milliliters of saturated sodium sulfate. The anolyte was 100 milliliters of a solution containing 0.13 grams of ferric sulfate and 0.745 grams of the trisodium salt of N-(hydroxyethyl) ethylene-diaminetriacetic acid in demineralized water.

In order to determine the desired anodic potential for operation of the cell, cyclic voltametry studies were conducted between anodic potentials of $-0.3$ and $+1.2$ volts versus a saturated calomel reference electrode while current was monitored as a function of potential. A reaction was detected at $+0.4$ volts with a second reaction detected at 0.96 volts, as indicated by the change in slope of the curve at that voltage. This second reaction is interpreted as oxygen evolution. The first reaction is the result of decarboxylation of the trisodium salt of N-(hydroxyethyl) ethylene-diaminetriacetic acid. Since the oxidation potential achieved utilizing air oxidation (of a lower valence polyvalent metal chelate to a higher valence state polyvalent metal chelate) is higher than the decarboxylation potential of the trisodium salt of N-(hydroxyethyl)ethylene-diaminetriacetic acid, air oxidation will decompose a polyvalent metal chelate based upon the trisodium salt of N-(hydroxyethyl) ethylene-diaminetriacetic acid. The oxidation of a ferrous chelate based upon the trisodium salt of N-(hydroxyethyl)ethylene- diaminetriacetic acid occurs at a much lower oxidation potential than the degradation reaction of the trisodium salt of N-(hydroxyethyl) ethylene-diaminetriacetic acid, as determined by the cyclic voltametry study.

These results show that a solution of a ferrous chelate based upon the trisodium salt of N-(hydroxyethyl) ethylene- diaminetriacetic acid can be oxidized electrochemically in an electrochemical cell in which the anode is operated at a potential above the oxidation potential of the polyvalent metal chelate and below the oxidation potential of the chelate portion of the polyvalent metal chelate. If operated within these limits, the chelating agent is not degraded and a spent gas scrubbing solution containing a lower valence state polyvalent metal chelate can be regenerated to the higher valence state polyvalent metal chelate for subsequent use as a lean, scrubbing solution in a contact zone in which hydrogen sulfide is abated from a fluid stream.

EXAMPLE 2

Cyclic voltametry studies were conducted in an electrolytic cell having a nickel cathode, a cation exchange membrane and various anodes as follows: a platinum screen, a ruthenium oxide coated titanium anode, an $IrO_2$ coated titanium anode, a graphite sheet, and a porous graphite anode. The rate of oxidation of a ferrous chelate based upon the trisodium salt of N-(hydroxyethyl) ethylene-diaminetriacetic acid utilizing these anodes was measured. The rates of oxidation, as indicated by current density, in amps per square inch, at +0.5 volts, versus a standard calomel electrode, show that the porous graphite anode is far superior in providing a high rate of oxidation as compared to the other anodes. In addition, the other anodes are more expensive. The porous, high surface area, graphite anode is relatively inexpensive and readily available as well as stable and inert under the conditions of the electrolytic cell. The current density in amps per square inch at 0.5 volts for the various anodes used in this electrolytic cell are as follows:
platinum screen 0.079
ruthenium oxide on titanium anode 0.031
$IrO_2$ on a titianium sheet anode 0.032
graphite sheet 0.034
porous graphite anode 0.32

EXAMPLE 3

An electrochemical cell was used to demonstrate that electrochemical regeneration of a ferric chelate based upon the trisodium salt of N-(hydroxyethyl) ethylene-diaminetriacetic acid could be achieved without chelate degradation. The electrochemical cell consisted of two parallel 10.4 square inch plate electrodes, a ruthenium oxide coated titanium anode, and a stainless steel cathode. A cation exchange membrane sold under the trade designation NAFION 324 was used to separate the catholyte and anolyte compartments. The electrolyte gaps between the electrodes and membrane were one-eighth inch in width. The cell was fitted with a saturated calomel reference electrode to monitor the anode potential. An ECO Instruments Model 550 potentiostat was used to supply power to the cell. A model 721 ECO Instruments Integrator monitored the coulombs passed. One liter of one molar sodium sulfate was used as the catholyte. The anolyte used was one liter of 0.38 weight percent iron in a 5.9 weight percent solution of the trisodium salt of N-(hydroxyethyl)ethylene-diaminetriacetic acid. The ferrous iron chelate in the amount of 56 grams per liter was transferred to a mixer and 20 milliliters of a one molar solution of NaHS were added to react with 50 percent of the ferrous iron. After mixing, the solution was filtered to remove the sulfur and the anolyte was transferred to the electrolyzer reservoir. The electrolytes were pumped through the cell until about 3900 coulombs were passed to reoxidize the reduced (ferrous) iron. This process was repeated twelve times using the same chelate solution. The anolyte was sampled after every four cycles and analyzed for the concentration of the trisodium salt of N-(hydroxyethyl)ethylene-diaminetriacetic acid. Samples of the sulfur produced were also submitted for analysis. The results obtained indicate that no significant chelate degradation occurred. The sulfur recovered was about 99 percent of that which was added as sulfide. The sulfur was bright yellow, contained 43 parts per million of iron, and was composed of ten micron particles in the form of 100 micron agglomerates.

While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purpose of illustration which do not constitute departures from the spirit and scope of the invention.

The embodiments of the invention in which an exclusive property or privilege is claimed are defined as follows:

1. An electrochemical cell for regeneration of at least one lower valence state polyvalent meal chelate, present in a spent, aqueous, alkaline, scrubbing solution, without substantial degradation of said chelate, said cell comprising:
(A) a porous graphite anode having a high surface area and a reference electrode to monitor the potential of said anode,
(B) a cathode,
(C) a permselective membrane separator,
(D) an anolyte comprising said spent, aqueous, alkaline scrubbing solution, and
(E) an external electrical circuit connected to said anode and said cathode, wherein said circuit is maintained, by control means comprising anode potential control means responsive to the anodic potential monitored by said reference electrode, at a value such that the anode potential of said cell is maintained above the oxidation potential of said lower valence state polyvalent metal chelate but below the oxidation potential of the chelate portion of said polyvalent metal chelate.

2. The electrochemical cell of claim 1 wherein said anolyte comprises a lower valence state polyvalent metal chelate formed by reaction of a polyvalent metal with an acid, an alkali metal, or an ammonium salt thereof wherein said acid is selected from the group consisting of an amino carboxylic acid and an amino polycarboxylic acid.

3. The electrochemical cell of claim 2 wherein said polyvalent metal in said chelate is selected from the group consisting of iron, copper, and manganese.

4. The electrochemical cell of claim 3 wherein said polyvalent metal iron and said acid is an amino carboxylic acid.

5. The electrochemical cell of claim 4 wherein said permselective membrane separator is a cation exchange membrane and said anolyte is controlled at a pH of about 6.5 to about 7.5, said circuit is maintained by potentiostat control means so as to maintain anode potential below about +0.4 volts, and said chelate is ethylene diamine tetra-acetic acid.

6. The electrochemical cell of claim 4 wherein said cathode is nickel or stainless steel, said reference electrode is a saturated calomel electrode, said lower valence state polyvalent metal chelate is a ferrous chelate of the trisodium salt of N-(hydroxyethyl) ethylene-diamine-triacetic acid and said anolyte is controlled at a pH of about 6.9 to about 7.1.

* * * * *